United States Patent [19]

Davies

[11] 3,933,673

[45] Jan. 20, 1976

[54] DETERGENT COMPOSITIONS CONTAINING POLYMERIC BUILDERS

[75] Inventor: Richard Llewelyn Davies, Bebington, England

[73] Assignee: Lever Brothers Company, New York, N.Y.

[22] Filed: Dec. 22, 1970

[21] Appl. No.: 100,780

[30] Foreign Application Priority Data

Jan. 8, 1970 United Kingdom.................. 925/70

[52] U.S. Cl. .................... 252/135; 252/89; 252/99; 252/384; 252/539; 252/558; 252/DIG. 2; 252/DIG. 11
[51] Int. Cl.$^2$.......................................... C11D 3/37
[58] Field of Search .............. 252/539, 558, DIG. 2, DIG. 15, 252/89, 384, 135; 260/78, 4 D

[56] References Cited

UNITED STATES PATENTS

| 3,284,364 | 11/1966 | Siegele ........................... 252/558 X |
| 3,308,067 | 3/1967 | Diehl ............................. 252/558 X |
| 3,346,504 | 10/1967 | Herrmann ...................... 252/539 X |
| 3,400,176 | 9/1968 | Quimby ......................... 252/558 X |

Primary Examiner—Herbert B. Guynn
Attorney, Agent, or Firm—Arnold Grant, Esq.

[57] ABSTRACT

Partial salts, particularly alkali metal salts, of polymeric aliphatic carboxylic acids are made by isolation from their aqueous solutions, the degree of neutralisation being not more than about 60%. The partial salts have improved storage properties which facilitates their use, for example in detergent compositions.

6 Claims, No Drawings

DETERGENT COMPOSITIONS CONTAINING POLYMERIC BUILDERS

The present invention relates to chemical compounds and to detergent compositions incorporating such compounds, and in particular to chemical compounds adapted for use as detergency builders in detergent compositions.

It has been proposed to use as detergency builders salts of synthetic polycarboxylic acid compounds, particularly salts of relatively high molecular weight polymers and copolymers of unsaturated aliphatic carboxylic acids such as polyacrylic acid. These materials are commonly used in the form of their alkali metal salts, for example sodium salts, but these salts are sometimes difficult to produce in dry form and they tend to have unsatisfactory storage properties when exposed to the air. Moveover, when incorporated in detergent compositions, the presence of such polycarboxylate detergency builders tends to impair the storage properties of the detergent compositions.

The salts of polymeric aliphatic carboxylic acids can also be used as stabilisers and thickeners in liquid compositions, for example liquid detergent compositions, when they are usually used in much smaller proportions than when used as detergency builders.

In view of the difficulties of producing dry salts of polymeric aliphatic carboxylic acids the compositions are usually supplied commercially in aqueous solution, which is expensive in terms of packaging and transport costs. Alternatively, the free acid can in some cases be supplied in powder form, but this then requires neutralisation to the salt, and the difficulties caused by the hygroscopicity of the salt are still present when the salt is subsequently desired in powder form.

We have now found that polymeric aliphatic carboxylic acids which are partially neutralised can be prepared relatively readily in dry form and have commercially satisfactory storage properties. Moreover, detergent compositions with satisfactory storage properties can be made from such partially neutralised polymeric aliphatic carboxylic acids.

According to the present invention a process for the preparation of a partial salt of a polymeric aliphatic carboxylic acid comprising isolating the partial salt from an aqueous solution thereof, the extent of neutralisation of the acid being up to about 60% by weight.

The invention includes a partial salt of a polymeric aliphatic carboxylic acid which is partially neutralised to the extent of up to about 60% by weight. The salt-forming cation is normally an alkali metal cation, but other cations such as ammonium or substituted ammonium cations can alternatively be used.

It should be mentioned that the partial salts of the polymeric aliphatic carboxylic acids cannot be made by simple admixture of a fully neutralised salt and the acid itself, as this would not give the required physical properties to the mixture. The partial salts can only be prepared satisfactorily and in accordance with this invention by isolation of the partial salts from their aqueous solutions.

The invention further includes a detergent composition incorporating as a detergency builder a polymeric aliphatic carboxylic material of which up to about 60% by weight is in water soluble salt form, particularly as the alkali metal salt. The detergent composition can be made by admixture of its ingredients including a partial salt of a polymeric aliphatic carboxylic acid as described or, preferably, by isolation of the detergent composition from an aqueous slurry which includes a partial alkali metal salt of a polymeric aliphatic carboxylic acid. Such detergent compositions are generally powdered or granular products, but they may alternatively be in tablet, flake or other dry form.

In addition to the polymeric carboxylic compounds, the detergent compositions essentially incorporate one or more detergent active compounds, which may be anionic, nonionic, zwitterionic or amphoteric compounds or mixtures thereof.

Suitable anionic detergent active compositions which can be used include for example, sodium and potassium alkyl sulphates, especially those obtained by sulphating the higher ($C_8$–$C_{18}$) alcohols produced by reducing the glycerides of tallow or coconut oil; sodium and potassium alkyl ($C_9$–$C_{20}$) benzene sulphonates, particularly sodium linear secondary alkyl ($C_{10}$–$C_{15}$) benzene sulphonates; sodium alkyl glyceryl ether sulphates; sodium coconut oil fatty acid monoglyceride sulphates and sulphonates; sodium and potassium salts of sulphuric acid esters of higher ($C_9$–$C_{18}$) fatty alcohol-alkylene oxide, particularly ethylene oxide, reaction products; the reaction products of fatty acids such as coconut fatty acids esterified with isethionic acid and neutralised with sodium hydroxide; sodium and potassium salts of fatty acid amides of methyl taurine; alkane sulphonates such as those derived by reacting alpha-olefins ($C_8$–$C_{20}$) with sodium bisulphite; and olefin sulphonates, which term is used to cover the material made by reacting olefins, particularly alpha-olefins, with $SO_3$ and then neutralising and hydrolysing the reaction product. The anionic detergent active compound could alternatively be a soap, especially a sodium or potassium soap of mixed nut oil and tallow fatty acids.

Examples of suitable nonionic detergent active compounds include the reaction products of alkylene oxides, usually ethylene oxide, with alkyl ($C_6$–$C_{12}$) phenols, generally 5 to 25 EO, i.e. 5 to 25 units of ethylene oxide per molecule; the condensation products of aliphatic ($C_8$–$C_{18}$) alcohols with ethylene oxide, generally 6 to 30 EO, and products made by condensation of ethylene oxide with the reaction products of propylene oxide and ethylenediamine. Other suitable nonionic detergent active compounds include tertiary amine oxides, generally having one alkyl ($C_8$–$C_{18}$) radical, two methyl, ethyl or hydroxy ethyl radicals, and analogous tertiary phosphine oxides and dialkyl sulphoxides.

Suitable amphoteric synthetic detergents are derivatives of aliphatic secondary and tertiary amines, with at least one $C_8$ to $C_{18}$ aliphatic radical and with an anionic water solubilising group, for example sodium N-2-hydroxyalkyl-N-methyl-taurates. Suitable zwitterionic synthetic detergents are derivatives of aliphatic quaternary ammonium compounds, sulphonium compounds and phosphonium compounds with at least one $C_8$ to $C_{18}$ aliphatic radical and an anionic water solubilising group, for example sulphobetaines.

These and other suitable detergent active compounds are described in the literature, for example "Surface Active Agents" by Schwartz and Perry and "Surface Active Agents and Detergents" by Schwartz, Perry and Berch.

When the salts of polymeric aliphatic carboxylic acids are used in detergent compositions as detergency builders, the amount of the salts is generally in the range of from about 10 to 50% by weight, calculated in the fully neutralised salt form. The ratio of the detergent active compound or compounds to the detergency builder is generally in the range of from about 3:1 to about 1:10 parts by weight.

The polymeric aliphatic carboxylic acids which are used to form the partial salts according to the invention are homopolymers or copolymers of unsaturated aliphatic mono- or polycaboxylic acids, which in the case of copolymers contain at least about 50% by weight of units derived from such polycarboxylic acids. Suitable unsaturated aliphatic mono- and polycarboxylic acids include, for example, acrylic acid, methacrylic acid, maleic acid, fumaric acid, itaconic acid, aconitic acid, crotonic acid, and citraconic acid. The polycarboxylic acids such as maleic acid can, if necessary or desirable, be polymerised in the form of their anhydrides and subsequently hydrolysed. Other unsaturated aliphatic carboxylic acids may be used but they tend to be more expensive and their salts are less water-soluble as the equivalent weight increases. The preferred polymeric aliphatic carboxylic acids are those containing at least 50% by weight of monomeric units derived from unsaturated aliphatic mono or polycarboxylic acids containing not more than 3 carbon atoms other than carbon atoms in carboxyl groups.

The copolymers may be formed of mixtures of the unsaturated aliphatic carboxylic acids with or without other copolymerisable monomers, or they may be formed from single unsaturated alphatic carboxylic acids with other copolymerisable monomers. In either case the percentage by weight in the polymer of units derived from non-carboxylic acids should be not more than about 50%. Suitable copolymerisable monomers include, for example, vinyl chloride, acrylonitrile, vinyl acetate, methyl acrylate, methyl methacrylate, styrene, vinyl methyl ether, acrylamide, ethylene, propylene and 3-butenoic acid. However, the amounts of these monomers, such as vinyl methyl ether styrene and vinyl acetate, which have relatively large organic radicals preferably should not be such as to render the fully neutralised salts of the polymers water-insoluble or dispersible. Moreover the presence of such large organic radicals tends to diminish the detergency building properties of the salts. It is preferred to have no more than about 30% by weight of units of any copolymerisable monomer with an organic radical having a molecular weight greater than 16 when the salts of the polymeric aliphatic carboxylic acid are to be used as detergency builders.

The molecular weight of the polymeric aliphatic carboxylic acid may vary considerably provided that the salt is still water-soluble or dispersible. The molecular weight is generally in the range of from about 5,000 to 1,000,000.

The present invention is particularly applicable to the preparation of partial salts of homopolymers and copolymers of acrylic acid, which incorporate in the case of the copolymers at least about 50% and preferably at least about 80% by weight of units derived from acrylic acid. Other specific preferred polymeric aliphatic carboxylic materials are the homopolymers and copolymers of maleic anhydride, especially the copolymers with ethylene, styrene and vinyl methyl ether. Suitable polymeric aliphatic carboxylic acids are commercially available, for example products sold under the trade names Versicol and Gantrez.

The polymerisation of acrylic acid homo- and copolymers can be accomplished using free-radical initiators, such as alkali metal persulphates, acyl and aryl peroxides, acyl and aryl peresters and aliphatic azo-compounds. The reaction may be carried out in situ or in aqueous or non-aqueous solution or suspension. Chain-terminating agents may be added to control the molecular weight. The copolymers of maleic anhydride may be synthesised using any of the types of free-radical initiators mentioned above in suitable solvents such as benzene or acetone, or in the absence of a solvent under an inert atmosphere. These polymerisation techniques are well known in the art. It will be appreciated that instead of a single polymeric aliphatic carboxylic acid being used, mixtures of two or more polymeric aliphatic carboxylic acids may be used to prepare the partial salts according to the invention.

The degree of neutralisation of the polymeric aliphatic carboxylic acids to facilitate preparation of the partial salts in dry form and give optimum properties as regards hygroscopicity and consequent stability during storage, depends on the nature of the polymers or copolymers. In the case of homopolymers of unsaturated aliphatic carboxylic acids without any substituent organic radicals apart from methyl or carboxylic radicals, or copolymers incorporating at least about 80% of units of such carboxylic acids, it is preferred to prepare and use partial salts neutralised to the extent of at least about 20% by weight. With less than about 20% neutralisation it tends to be more difficult to prepare the partial salts in dry form, apparently due to a tendency for the polymeric carboxylic acid to undergo further polymerisation during heat drying. This tendency is particularly noticeable in the case of homopolymers of acrylic acid.

In the case of homopolymers or copolymers of unsaturated aliphatic carboxylic acids other than the homopolymers and copolymers of the carboxylic acids having only methyl and carboxylic radicals mentioned above it is generally possible to prepare and use partial salts or less than about 20% neutralisation, as the tendency of these materials to polymerise further is apparently minimal. However, there is generally little benefit to be achieved in making and using a partial salt of less than about 10% neutralisation.

In general the maximum degree of neutralisation as regards the optimum physical properties of the partial salt in dry form and the ease of its preparation is about 50%, but for some polymeric aliphatic carboxylic compounds the maximum degree of neutralisation for satisfactory properties may be lower than this, for example 40 or 45% neutralisation. The optimum degree of neutralisation of the partial salts of any polymeric aliphatic carboxylic acids according to the invention are readily determinable by simple experiment.

Isolation of the partial salts of the polymeric carboxylic acids from the aqueous solutions is normally accomplished by some form of heat drying, for example by spray-drying, depending on the desired physical form of the product, for example powdered, flaked or granular form. The aqueous solutions may be prepared by dissolution of the acid and then neutralised by addition of an alkaline material, preferably an alkali metal hydroxide, for example sodium or potassium hydroxides. The aqueous solutions may alternatively be prepared from appropriate amounts of the acid itself and a fully neutralised salt.

Although a polymeric aliphatic carboxylic acid can be incorporated as a detergency builder in a detergent composition in the form of its partial salt, the polymeric carboxylic acid needs to be fully neutralised when the composition is used for fabric washing or other purposes. To accomplish this the detergent composition may additionally incorporate one or more alkaline salts, preferably alkali metal salts, for example sodium or potassium carbonates, alkaline silicates or metasilicates, which fully neutralise the acid when the composition is dissolved in water. Alternatively, an alkaline salt may be added separately to an aqueous solution of a detergent composition, but this is less convenient and would only be practical for commercial use, for example in laundries.

However, when alkaline salts are incorporated in detergent compositions to neutralise the polymeric aliphatic carboxylic acids during use, the amounts of such salts should be as low as possible. This enables the compositions to incorporate sufficient amounts of other essential ingredients, particularly the detergent active compounds and the polymeric aliphatic carboxylic acid detergency builder itself, for satisfactory fabric washing properties. So as to minimise the amount of alkaline salt necessary in a detergent composition to neutralise fully the polymer aliphatic carboxylic acid detergency builder when the composition is used, it is preferable to use in the detergent composition a partial salt of such an acid neutralised to the maximum extent possible whilst retaining satisfactory properties for the partial salt.

The detergent compositions may include optional ingredients of the usual type, for example bleaching materials and bleach activators, fluorescent agents, germicides, enzymes, anti-redeposition agents, lather boosters or suppressors and colourants. Detergent compositions also commonly incorporate minor amounts of water, usually from about 5 to about 10% by weight in the case of detergent compositions in powder form.

The invention is illustrated by the following Examples in which parts and percentages are by weight except where otherwise indicated.

EXAMPLE 1

A series of partial salts of polyacrylic acid were prepared as follows. A 25% aqueous solution of a polyacrylic acid obtained from Allied Colloids Ltd under a trade name "Versicol E7" was neutralised by the addition of various amounts of sodium hydroxide in flake form. Sodium sulphate in the ratio of 1 part to 5 parts of the polyacrylic acid was also added to the solution to increase the bulk density of the spray-dried product subsequently produced. The clear aqueous solutions of the partially neutralised polyacrylic acids together with a fully neutralised sample, which had water contents of between 68 and 71% by weight depending on the degree of neutralisation of the acid, were each heated to 90°C and then spray-dried. The conditions of spray-drying were as follows:

```
Atomising pressure        150–200 psi
Air inlet temperature     325°C
Air inlet flow rate       100 lbs per minute
```

The powders formed had the properties shown in Table I below.

Table I

| Power Reference | % Neutralization | pH of 1% aqueous solution | % moisture |
|---|---|---|---|
| A | 10.0 | 3.55 | 0.4 |
| B | 20.8 | 4.43 | 4.5 |
| C | 29.3 | 4.63 | 2.8 |
| D | 38.0 | 4.92 | 2.5 |
| E | 48.4 | 5.32 | 1.0 |
| E | 58.2 | 5.70 | 2.6 |
| G | 67.5 | 6.07 | 3.8 |
| H | 77.0 | 6.47 | 4.2 |
| I | 86.5 | 6.82 | 4.4 |
| J | 100 | 8.55 | 0.0 |

For comparative purposes the same procedure was followed with an unneutralised solution of the polyacrylic acid but it was found to be impossible to obtain a powder by so doing, apparently due to further polymerisation of the polyacrylic acid during the spray-drying operation. The polymer formed had a glass-like appearance and was not readily soluble in water. Furthermore, the polymer adhered firmly to surfaces which it contacted, particularly the walls of the spray-drying tower. There was also difficulty in producing the powder A, as again some further polymerisation of the acid appeared to take place under the spray-drying conditions and only 10% of the powder was in fact obtained, the remainder staying in the tower or in the pipelines to the tower. All of the powders which were produced were crisp and free-flowing and white in colour, with the exception of powder J which was a dirty grey colour, possible due to the presence of some impurities.

Storage tests were undertaken in respect to powders A to J by exposing samples of the powders in open dishes for one week to varying conditions of temperature and relative humidity (RH). The equilibrium moisture contents of the powders and their physical appearances are described in Table II below.

Table II

| Power Ref. | Equilibrium moisture content and physical appearance after one week's storage | | | | | |
|---|---|---|---|---|---|---|
| | 28°C/70% RH | | 37°/70% RH | | 20°C/90% RH | |
| | %H$_2$O | Appearance | %H$_2$O | Appearance | %H$_2$O | Appearance |
| A | 6.7 | Surface slightly caked, otherwise good | 11.2 | Complete hard mass of powder | 31.9 | Hard sticky mass |
| B | 8.3 | Good free flowing powder | 12.2 | Hard surface, remaining powder crisp | 33.3 | Hard sticky mass |
| C | 8.6 | Good free flowing powder | 12.0 | Hard surface, remaining powder slightly soft | 33.9 | Hard sticky mass |
| D | 9.5 | Good free flowing powder | 13.1 | Hard surface, remaining powder crisp | 36.3 | Hard sticky mass |
| E | 11.9 | Good free flowing powder | 18.6 | Hard crisp powder | 41.7 | Very soft and sticky |
| F | 10.5 | Good free flowing powder | 23.3 | Soft spongy powder | 45.1 | Soft and sticky |
| G | 13.5 | Surface slight caked, otherwise good | 27.8 | Soft spongy powder | 48.8 | Very soft, almost liquid |
| H | 19.5 | Surface badly caked | 32.9 | Sticky slurry | 52.1 | Liquid |

Table II-continued

| Power Ref. | Equilibrium moisture content and physical appearance after one week's storage | | | | | |
|---|---|---|---|---|---|---|
| | 28°C/70% RH | | 37°/70% RH | | 20°C/90% RH | |
| | %H₂O | Appearance | %H₂O | Appearance | %H₂O | Appearance |
| I | 23.5 | Spongy almost fully caked powder | 35.5 | Sticky slurry | 54.2 | Liquid |
| J | 29.9 | Fully caked powder | 39.4 | Sticky slurry | 55.6 | Liquid |

Although all the powders had unsatisfactory properties after storage at 90% RH, only the powders made from the polyacrylic acid neutralised to the extent of from 20 to 60% had satisfactory properties after storage under the conditions (28°C and 70% RH) simulating severe conditions of domestic storage in temperate countries.

A further storage trial was conducted of powders C and J, when they were left exposed to the atmosphere in open trays for a period of 7 days. Powder C retained its original free-flowing qualities throughout this period of storage whereas powder J changed its physical form, in particular it became sticky, caked, dried out or broke up, depending on the variable weather conditions during the period of storage.

EXAMPLE 2

A detergent powder was made by the following process. A 25% aqueous solution of polyacrylic acid as used in Example 1 was mixed with anhydrous dodecyl benzene sulphonic acid (prepared by sulphonation of DOBS 055 obtained from Shell Chemicals Ltd) in a conventional paddle mixer. The mix was partially neutralised with flaked sodium hydroxide to give an aqueous slurry containing sodium dodecyl benzene sulphonate and partially neutralised polyacrylic acid, 45% of which was in the form of the sodium salt. Other conventional detergent ingredients were added to the mix and the temperature of the slurry was raised to 90°C. Its nominal moisture content was 54%.

The slurry prepared as described above was de-aerated, the specific gravity before and after de-aeration being 0.70 lbs per cu.ft. and 1.05 lbs per cu.ft., respectively, and then spray-dried by spraying under pressure into a tower up which air at 325°C was passed at a rate of 100 lbs per minute.

The resultant powder had added to it amounts of sodium carbonate and sodium perborate tetrahydrate and then had the formulation in Table III below:

Table III

| Ingredient | Parts |
|---|---|
| Sodium dodecyl benzene sulphonate | 20 |
| Sodium polyacrylate | 16 |
| Polyacrylic acid | 14.8 |
| Sodium carbonate | 13.0 |
| Sodium carboxymethylcellulose | 0.5 |
| Sodium toluene sulphonate | 1.0 |

Table III-continued

| Ingredient | Parts |
|---|---|
| Coconut monoethanolamide | 3.0 |
| Sodium perborate tetrahydrate | 20.0 |
| Water | 8.6 |

The resultant powder had a bulk density of 15.5 lbs per cu. ft. and a pH (1% aqueous solution) of 9.1.

The powder was subjected to storage for a period of one week in an open dish under varying conditions of temperature and humidity, namely 28°C/70% RH, 37°C/70% RH, 20°C/90% RH and under ambient conditions. After all but the most severe conditions of storage at 90% relative humidity, the powders were perfectly satisfactory; the sample stored at 20°C/90% RH had deteriorated slightly but would still be commercially acceptable.

For comparative purposes, a further detergent powder was similarly prepared, except that the polyacrylic acid was fully neutralised in the slurry and no sdium carbonate was added. The resultant powder was tested for its properties under the same varying storage conditions when it was found to become very soft at 28°C/70% RH and to liquefy on storage at 37°C/70% RH. This powder would be quite unsatisfactory for commercial use.

EXAMPLE 3

A series of partial salts were prepared of a maleic anhydride/vinyl methyl ether acid copolymer (1:1 molar ratio) obtained as a powder under the trade name Gantrez from General Aniline and Film Corporation. The partial salts were obtained as powders, containing about 7% water by disintegrating the flakes produced by drum-drying aqueous solutions of the acid to which varying amounts of sodium hydroxide were added to give a range of degrees of neutralisation. All of the partial salts were obtained as greyish white powders, whereas a fully neutralised salt prepared for comparative purposes was coloured orange, apparently due to impurities in the copolymer which are coloured at high pH.

The powders so formed were examined for their storage properties under varying conditions of temperature and relative humidity (RH).

Details of the partial salts formed and their storage properties are shown in Table IV below.

Table IV

| Powder | | Equilibrium moisture content and physical appearance after one week's storage | | | | |
|---|---|---|---|---|---|---|
| Reference | % neutralisation | 28°C/70% RH | | | 37°C/70% RH | |
| | | % H₂O | Appearance | | % H₂O | Appearance |
| K | 16.0 | 15.3 | Good white powder | | 17.1 | Partially caked white powder |
| L | 25.6 | 15.5 | Good white powder | | 18.0 | Partially caked white powder |
| M | 33.6 | 17.3 | Soft, partially caked white powder | | 22.8 | Fully caked white powder |
| N | 43.0 | 20.8 | Hard brown plastic material | | 29.1 | Hard brown plastic material |
| O | 56.8 | 26.6 | Hard brown plastic material | | 35.9 | Hard brown plastic material |
| P | 68.0 | 31.8 | Hard brown plastic material | | 40.0 | Hard brown plastic material |
| Q | 80.0 | 31.2 | Hard brown plastic material | | 40.4 | Hard brown plastic material |

Table IV-continued

| Powder Reference | % neutralisation | Equilibrium moisture content and physical appearance after one week's storage | | | |
|---|---|---|---|---|---|
| | | 28°C/70% RH | | 37°C/70% RH | |
| | | % H$_2$O | Appearance | % H$_2$O | Appearance |
| R | 91.2 | 38.0 | Hard brown plastic material | 47.2 | Hard brown plastic material |
| S | 100.0 | 38.9 | Hard brown plastic material | 48.2 | Hard brown plastic material |

The partially neutralised salts were also stored in open dishes under ambient room conditions, when it was found that the materials K to N had perfectly satisfactory storage properties, powder O turned sticky and powders P to S turned to slurries after storage for a week.

For use in a powdered detergent composition the degree of neutralisation of the maleic anhydride/vinyl methyl ether copolymer should be not more than about 40% for the powder to have satisfactory storage properties in the conventional laminated cardboard cartons.

What is claimed is:

1. A process for preparing a detergent composition comprising the steps of:
   a. preparing an aqueous solution of a polymeric aliphatic carboxylic acid containing at least 50 weight percent of monomeric units from at least one carboxylic acid selected from the group consisting of acrylic acid, and maleic acid, said polymeric aliphatic carboxylic acid having a molecular weight of from about 5,000 to about 1,000,000;
   b. forming a partial alkali metal salt by partially neutralising the acid to the extent of not more than 60 percent by weight;
   c. adding a detergent active compound selected from the group consisting of anionic, nonionic, zwitterionic, amphoteric compounds and mixtures thereof; and,
   d. isolating the partial alkali metal salt and the detergent active compound from the aqueous solution, to form a dry detergent composition, the ratio of the detergent active compound to the partial salt being from about 3:1 to about 1:10 parts by weight.

2. A process according to claim 1 wherein the extent of neutralisation of the partial alkali metal salt is from about 10 to 50 percent by weight.

3. A dry detergent composition comprising a detergent active compound selected from the group consisting of anionic, nonionic, zwitterionic, amphoteric compounds and mixtures thereof and as a builder therefore a partial alkali metal salt of a polymeric aliphatic carboxylic acid containing at least 50 percent by weight of monomeric units from at least one carboxylic acid selected from the group consisting of acrylic acid, and maleic acid, said polymeric aliphatic carboxylic acid having a molecular weight of from about 5,000 to about 1,000,000, the partial salt being neutralised to the extent of not more than about 60 percent by weight, and the ratio of the detergent active compound to the partial salt being from about 3:1 to about 1:10 parts by weight.

4. A detergent composition according to claim 3, wherein the partial salt is neutralised to the extent of from about 10 to 50% by weight.

5. A detergent composition according to claim 3 additionally including an alkaline alkali metal salt to neutralise fully the partial salt of the polymeric carboxylic compound when the composition is dissolved or dispersed in water.

6. A detergent composition according to claim 5 wherein the alkaline alkali metal salt is sodium or potassium carbonate, alkaline silicate or metasilicate.

* * * * *